S. JACKSON.
Carriage-Spring.
No. 63,053.
Patented Mar. 19, 1867.
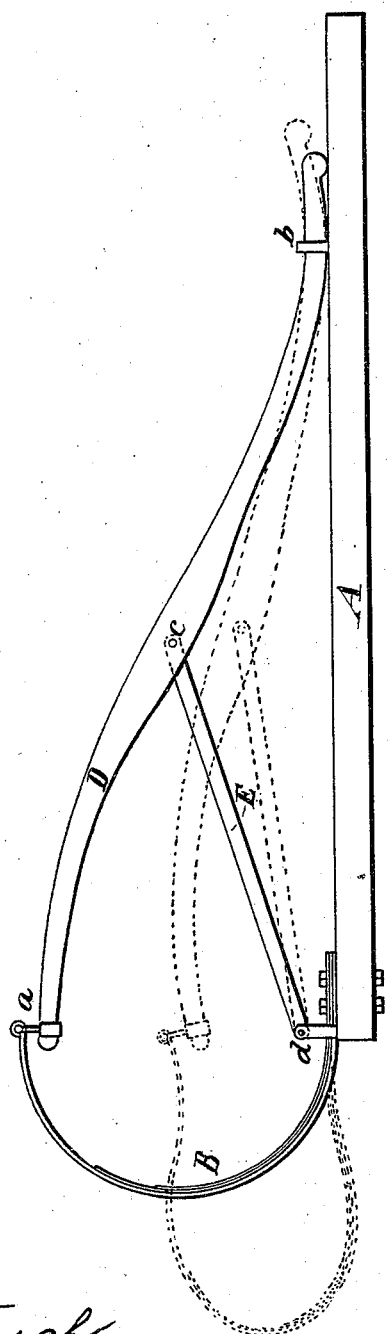
Witnesses:
Inventor:

United States Patent Office.

SAMUEL JACKSON, OF NEWARK, NEW JERSEY.

Letters Patent No. 63,053, dated March 19, 1867.

---

IMPROVEMENT IN COMPENSATING BRACES FOR THE SPRINGS OF VEHICLES.

---

*The Schedule referred to in these Letters Patent and making part of the same.*

---

TO ALL WHOM IT MAY CONCERN:

Be it known that I, SAMUEL JACKSON, of Newark, in the county of Essex, and State of New Jersey, have invented a new and improved Compensating Stay or Brace for the Springs of Wheel Vehicles; and I do hereby declare that the following is a full, clear, and exact description thereof, which will enable others skilled in the art to make and use the same, reference being had to the accompanying drawing, forming part of this specification.

The drawing represents a side view of a spring with my improvement applied to it.

The object of this invention is to apply a stay or brace to a vehicle spring in such a manner that it will work or move to conform to the yielding movement of the spring, and serve as an efficient brace to the latter at all points, or in whatever position the spring may be.

In the accompanying drawing, A represents the perch of a vehicle, and B a spring of C-form, having one end of a bar, D, attached to its upper end by a jointed clip, a. The opposite end of the bar D is slightly curved, and works freely within a guide, b, attached to the perch. E is a bar, which is connected at one end to the bar D by a joint or pivot, c, the opposite end being connected by a joint, d, to the end of the perch underneath the upper end of the spring. The bar E is equal in length to the portion of the bar D included between the pivot or joint c and the end which is attached to the spring B.

From the above description it will be seen that the spring B will be effectually stayed or braced in a lengthwise direction of the vehicle, and without in the least interfering with its yielding movement, as the bar D, when the spring is depressed, slides in the guide b on the perch, rendering the brace or stay attachment perfectly compensating.

This invention is applicable to any form of vehicle spring, and when applied to the ordinary elliptic spring the bar D may be attached to the centre of the spring, and two bars, E, applied to the spring, one near each end; said bars being connected to the bar D by a single pivot or joint, or by two joints in line with or coinciding with each other. This modification admits of the brace attachment serving as a check against sudden lateral movements of the vehicle. The invention may be applied both to the front and rear springs.

I do not confine myself to the precise arrangement of the parts herein shown and described, for that may be modified and arranged in various ways, and the same end attained.

Having thus described my invention, I claim as new, and desire to secure by Letters Patent—

The application to the springs of wheel vehicles of a stay or brace, arranged as shown and described, or in an equivalent way, to compensate for the yielding movement of the spring.

SAMUEL JACKSON.

Witnesses:
WM. F. MCNAMARA,
ALEX. F. ROBERTS.